United States Patent
Tabellini et al.

(10) Patent No.: US 6,260,439 B1
(45) Date of Patent: Jul. 17, 2001

(54) PROTECTIVE COVER WHICH CAN BE ATTACHED TO A MACHINING PART WHICH IS MOBILE AT LEAST ACCORDING TO A PLANE

(75) Inventors: Giorgio Tabellini, Sasso Marconi; Walter Goldin, Laives, both of (IT)

(73) Assignee: P.E.I. Protezioni Elaborazioni Industriali S.r.L., Bologna (IT)

( * ) Notice: Subject to any disclaimer, the term of this patent is extended or adjusted under 35 U.S.C. 154(b) by 0 days.

(21) Appl. No.: 09/408,293

(22) Filed: Sep. 29, 1999

(30) Foreign Application Priority Data

Sep. 30, 1998 (IT) ............................................... B098A0557

(51) Int. Cl.⁷ ......................................................... F16P 1/00
(52) U.S. Cl. ................................. 74/612; 74/608; 409/134
(58) Field of Search ............................ 74/608, 609, 612; 409/134; 160/202

(56) References Cited

U.S. PATENT DOCUMENTS 6,089,800 * 7/2000 Tabellini ................................. 74/608
6,116,830 * 9/2000 Azema ................................. 409/134

* cited by examiner

Primary Examiner—Dirk Wright
(74) Attorney, Agent, or Firm—Fay, Sharpe, Fagan, Minnich & McKee, LLP

(57) ABSTRACT

A protective cover for a zone of a machine tool, in which a machining part moves along an operating path, preferably extending on a single plane, in said zone; the cover comprises a plurality of cover elements consisting of a fixed cover element which can be fixed to the machine, a mobile element connected to the machining part and a plurality of mobile cover elements positioned between the fixed cover element and the mobile cover element which is connected to the machining part; the cover elements are closed in a pack, each with a window, and are arranged according to decreasing size and lie around the machining part, connected to one another by a first and a second support rod, at a given distance from one another and with respective mobile cursors on the rods so as to guide the mobile cover elements in a direction parallel with and a direction at right angles to the rods, during movement of the machining part, keeping the machining zone covered.

33 Claims, 9 Drawing Sheets

FIG. 11
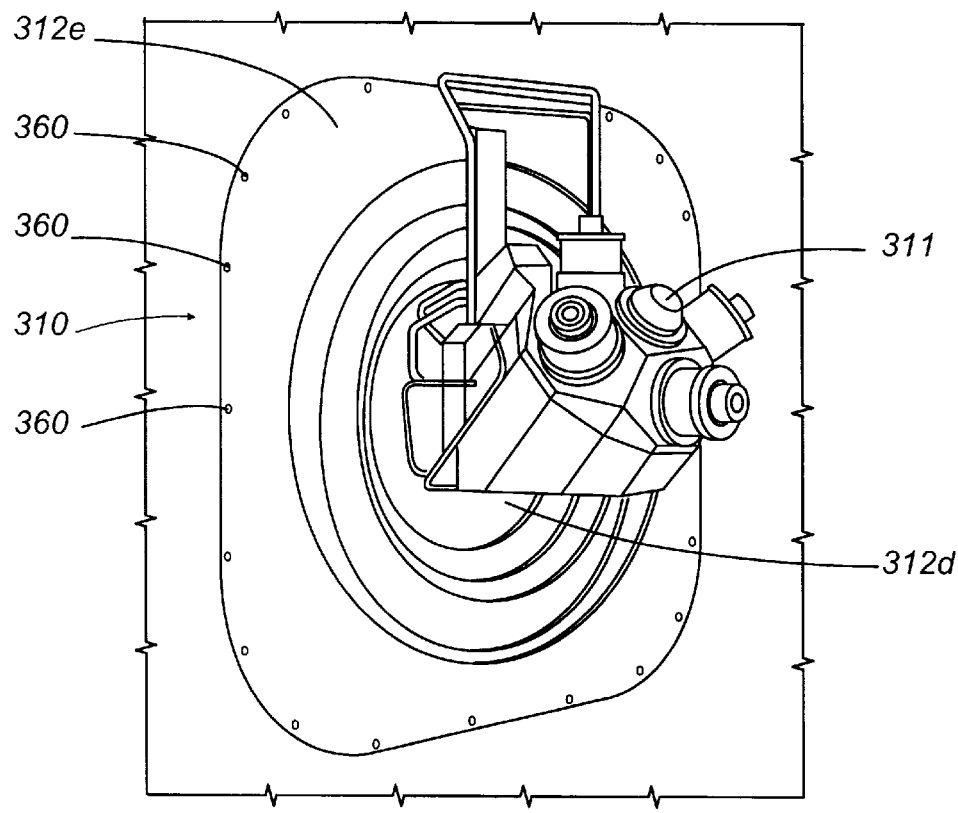
FIG. 14
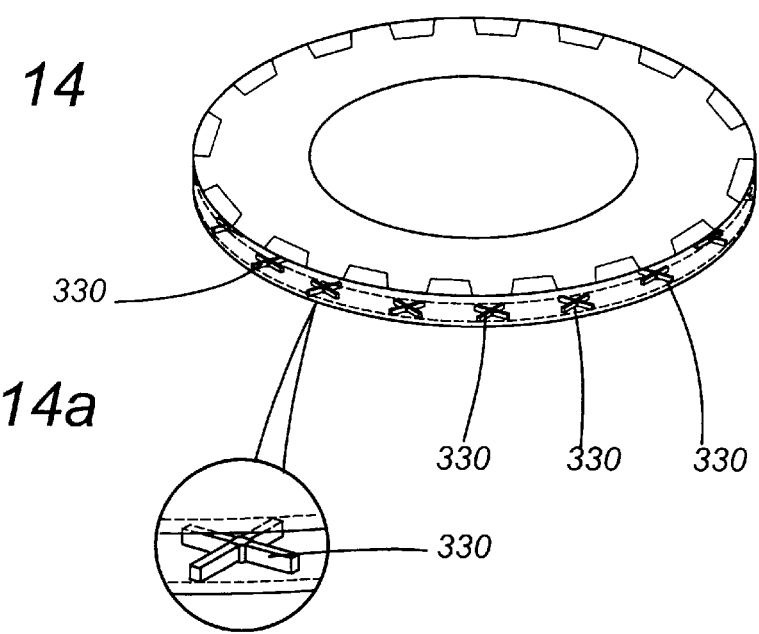
FIG. 14a

PROTECTIVE COVER WHICH CAN BE ATTACHED TO A MACHINING PART WHICH IS MOBILE AT LEAST ACCORDING TO A PLANE

BACKGROUND OF THE INVENTION

The present invention relates to a protective cover for an open zone of a machine tool or similar, in which there are machine moving parts within the area defined by said zone.

In particular, the cover is attached to a machining part or tool which moves along a respective operating path, preferably extending in accordance with at least two reference co-ordinates and, in particular, extending in a plane substantially parallel with the plane in which said area lies.

Such types of covers, described above, basically comprise a plurality of cover elements consisting of a set of substantially planar plates, closed together in a pack, and arranged one on top of the other in such a way that they make contact with one another. One of the plates is rigidly fixed along the edges of the machine which define the above-mentioned open zone, and acts as a support for the other plates, which slide relative to one another.

The perimetric dimensions of the fixed plate are such that it completely covers the open zone and has an opening which gives the plate the shape of a frame. The dimensions of the opening are substantially equal to the area in which the mobile tool is designed to move, defining the maximum travel possible for the tool along the two co-ordinates.

Starting with the fixed plate, the size of the remaining mobile plates decreases down to the last plate in the set, which is attached to the mobile tool. The shape of each plate is similar to that of the others and each has a respective opening, giving it a frame shape similar to that of the fixed plate. The outer and inner perimetric dimensions of a generic frame-shaped plate are similar to the outer and inner perimetric dimensions of the adjacent larger and smaller plates.

Each plate is kinematically connected to the others and its size complements that of the plates adjacent to it in such a way that, following a movement of the tool along the above-mentioned path, the plate attached to it draws behind it, in succession, the other plates, which slide over one another, keeping the area of the above-mentioned zone closed and protected during the tool operating movements. In this way, the cover allows protection of the machining tool support and drive parts extending towards the inside of the machine.

The drawing movements between the plates are transmitted by means of drive mechanisms, such as chains and corresponding toothed wheels, or four-bar linkages, with extremely complex and difficult operation, especially if the tool moves at relatively high operating speeds. Moreover, such types of mechanisms are not only costly and require long assembly times, but also make the covers heavy and too big.

SUMMARY OF THE INVENTION

The present invention mainly relates to a cover with the characteristics described in claim 1. In particular, a protective cover is provided for a machine zone with moving parts, in which the machine comprises a frame and a machining part which can move, relative to the frame, along an operating path, preferably extending in a single plane. The protective cover consists of cover means which comprise a plurality of cover elements, including a cover element which can be connected to the machine frame, a mobile cover element connected to the machining part and, if necessary, one or more mobile intermediate cover elements, located between the fixed cover element and the mobile cover element connected to the machining part. The cover elements are arranged in order of decreasing size, extend around the edge of the machining part and are connected to the machining part in such a way that they follow the machining part operating movements, keeping the machining zone covered; there being means which support the mobile cover elements connected to the fixed cover element; wherein the support means comprise a first and a second support rod, separated by a given distance, which also constitute guide means for the movement of the mobile elements in a direction parallel with and a direction at a right angle to the rods.

The use of such support and guide rods allows the disadvantages created by the above-mentioned chains and toothed wheels and the four-bar linkages described in the prior art to be overcome, with advantages in terms of simpler construction and operation of the present cover.

BRIEF DESCRIPTION OF THE DRAWINGS

Other technical characteristics and advantages of the invention are more clearly described in the detailed description which follows, with reference to the accompanying drawings, which illustrate preferred embodiments of the invention, without limiting the scope of application, and in which:

FIG. 11 is a perspective view of a third preferred embodiment of the cover;

FIG. 14 is a perspective view of a single disk-shaped cover element of the present third embodiment of the cover;

FIG 14a is an enlarged view of a detail of FIG. 14;

DESCRIPTION OF THE PREFERRED EMBODIMENTS

Figure 2:
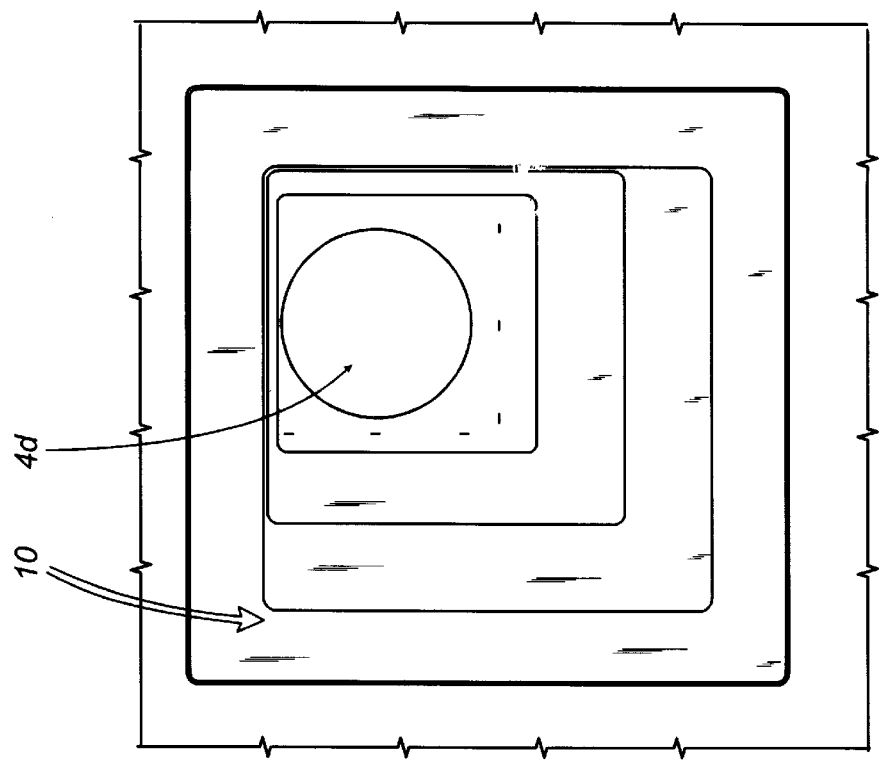
FIGS. 1 and 2 are front views of a first preferred embodiment of the present cover, in two operating position.
Figure 1:
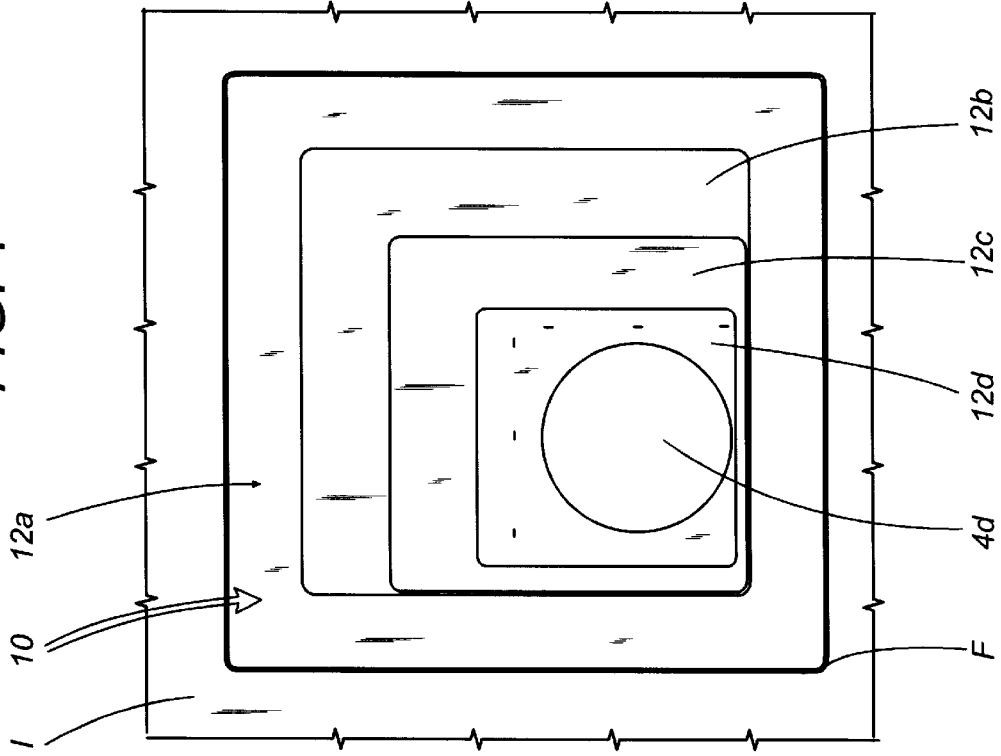
Figure 3:
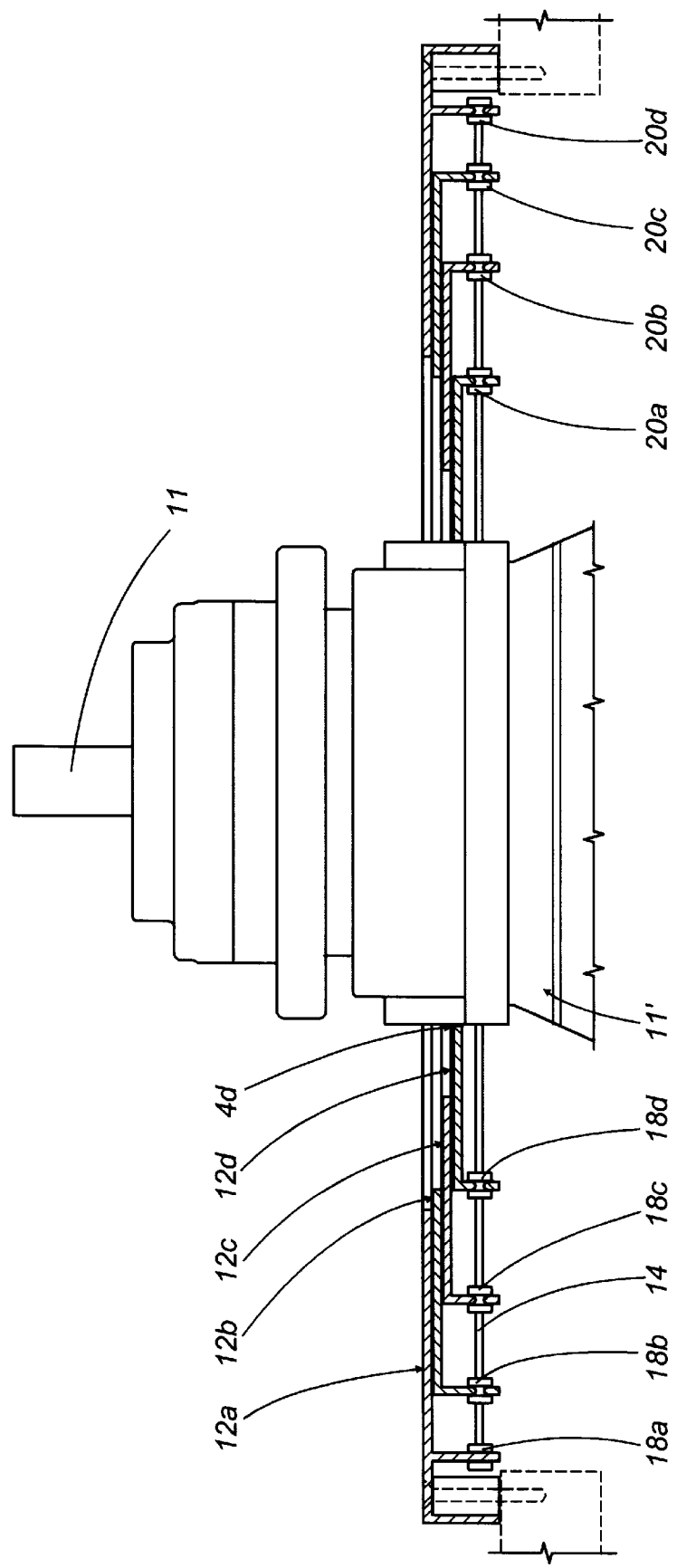
FIG. 3 is a cross-section of the first embodiment of the cover.

With reference to FIGS. 1 to 5, the present embodiment of a cover 10 is designed to protect a zone of a machine tool or similar, fitted with moving parts 11' (partially illustrated in FIG. 3). The moving parts 11' support and move a machining part 11, which can move along an operating path which preferably extends in a vertical plane, the machine moving parts to be protected 11' being located behind said machining part, inside the machine.

The cover 10 comprises a plurality of cover elements which, in the present first preferred embodiment, consist of an end cover element 12a which is fixed to the machine at a window F, through which the machining part 11 extends, made in the machine outer frame I, a mobile end element 12d, connected to the machining part 11 and having a central opening 4d to allow the passage of the machining part 11, as well as a first and a second intermediate cover element 12b, 12c, which can move and extend between the fixed cover element 12a and the mobile cover element 12d.

Starting from the fixed element 12a, the cover elements 12a, 12b, 12c, 12d are arranged in order of decreasing size and extend over the entire window F, being positioned around the edges of the machining part 11 and connected to the latter in such a way that they follow the machining part 11 operating movements, keeping the machining zone covered, as is more clearly described below.

Figure 4:
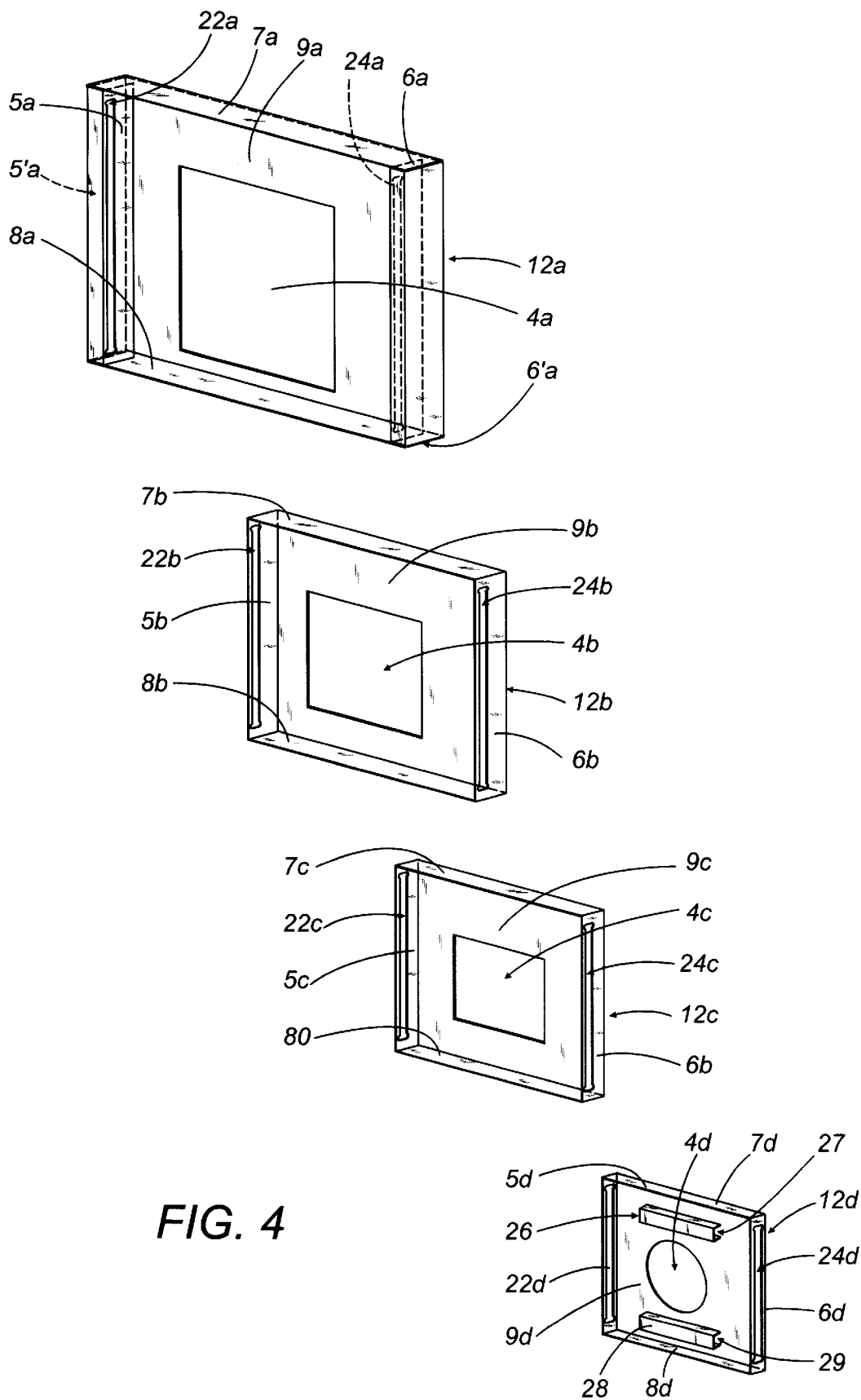
FIG. 4 is an exploded perspective view of only the cover elements of the present first embodiment.
Figures 5, 5A:
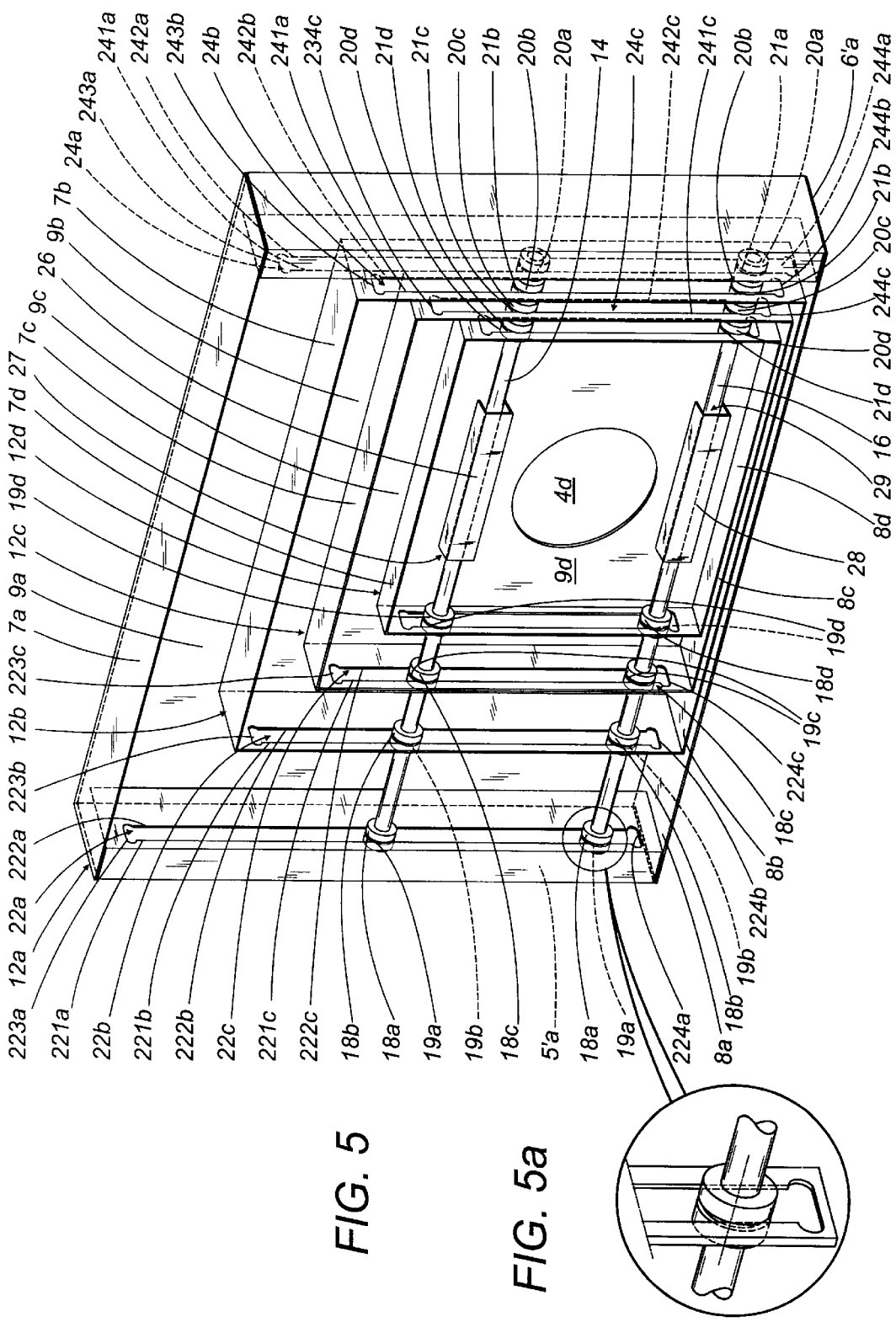
FIG. 5 is a perspective view of the rear part of the first embodiment.
FIG. 5a is an enlarged view of a detail of FIG. 4.

As illustrated in greater detail in FIGS. 4 and 5, the cover elements 12a, 12b, 12c, 12d consist of planar cover panels or plates 9a, 9b, 9c, 9d with respective openings 4a, 4b, 4c, 4d, which are substantially central and through which the mobile part 11 passes. Each opening gives the relative panel a frame shape which is similar to the shape of the other panels. The outer and inner perimetric dimensions of a generic frame-shaped panel are similar to the outer and inner perimetric dimensions of the adjacent smaller and larger panels. In particular, said dimensions are calculated in such a way as to make two successive panels complement one another, so as to cover an outer zone of the opening in the adjacent panel.

As illustrated in FIG. 3, the cover panels slide in contact with one another in such a way that they close the above-mentioned window F with a given hermetic seal. Moreover, the panels have an outer perimetric edge from which there extend, perpendicular to the cover plane, corresponding longitudinal walls 5a, 6a, 5b, 6b, 5c, 6c, 5d, 6d, located on opposite longitudinal sides of the cover element, and corresponding transversal walls 7a, 8a, 7b, 8b, 7c, 8c, 7d, 8d, located on corresponding opposite transversal sides of the cover element.

As illustrated in FIG. 5, the mobile cover elements attached to the fixed cover element are supported by a first 14 and a second 16 support rod. The rods are parallel and separated by a given distance, and define guide means for the movement of the mobile cover elements 12b, 12c, 12d in a direction parallel with and a direction at a right angle to the rods 14, 16.

In particular, the mobile cover elements 12b, 12c, 12d are guided in a direction parallel with the support rods 14, 16 by mobile cursors 18b, 20b, 18c, 20c, 18d, 20d, located between each of the cover elements and the rods 14 and 16 and free to slide on the support rods 14, 16 to which they are attached.

To guide the cover elements 12b, 12c, 12d in a direction at a right angle to the support rods 14, 16, the fixed and intermediate cover elements 12a, 12b, 12c have opposite rails 22a, 24a, 22b, 24b, 22c, 24c which extend at a right angle to the support rods 14, 16 and on which the rods 14, 16 can slide.

To obtain improved sliding of the support rods 14, 16, between the guide rails 22a, 24a, 22b, 24b, 22c, 24c and the support rods 14, 16 there are cursor parts which are applied on the rods and engage with the longitudinal guide rails in such a way that they slide on the latter. In FIG. 5 the cursors which allow the rods 14, 16 to slide on the rails 22a, 24a of the fixed cover element are labeled 18a, 20a, whilst the cursors which allow the rods 14, 16 to slide on the rails 22b, 24b, 22c, 24c of the mobile intermediate cover elements 12b, 12c are labeled 18b, 20b, 18c, 20c. The cursors of the intermediate cover elements 12b, 12c, therefore, simultaneously constitute cursors for sliding along the support rods 14, 16 and cursors for sliding along the corresponding guide rails 22b, 24b, 22c, 24c at a right angle to the support rods 14, 16.

Means are envisaged for fixing the first and second support rods 14, 16 to the mobile connecting element 12d, the means being such that they allow the mobile connecting element 12d to slide parallel with the support rods 14, 16.

As illustrated in FIG. 4, the means for fixing the first and second support rods 14, 16 to the mobile connecting element 12d comprise a first and a second "U"-shaped bracket 26, 28. The brackets are fixed to the cover panel 9d in such a way that they are separated by a given distance in the direction at a right angle to the support rods 14, 16 on opposite sides of the circular central opening 4d in the cover element 12d.

Said fixing brackets 26, 28 extend in a transversal direction, defining an elongated hole 27, 29 which houses the support rods 14, 16 in such a way that they can slide axially.

As illustrated, the guide rails 22a, 24a, 22b, 24b, 22c, 24c take the form of slots which extend in a direction set at a right angle to the support rods 14, 16, which are envisaged within the longitudinal perpendicular portions or walls 5a, 6a, 5b, 6b, 5c, 6c of each cover element.

Similar extended slots 5d, 6d, not specifically for the longitudinal sliding of the rods 14, 16, are also envisaged in the longitudinal perpendicular portions or walls 5d, 6d of the element 12d.

As illustrated in FIGS. 4 and 5, the fixed cover element 12a also has longitudinal false walls 5'a, 6'a at the longitudinal guide walls 5a, 6a.

As illustrated in FIG. 5a, each one of the sliding cursors 18a, 20a, 18b, 20b, 18c, 20c, 18d, 20d take the form of a circular wheel inserted coaxially in such a way that it is free to rotate and so that it can slide axially on the support rod 14, 16.

Each wheel-shaped cursor has an outer perimetric surface in which there is a circumferential groove 19a, 21a, 19b, 21b, 19c, 21c, 19d, 21d for the insertion and sliding engagement of the longitudinal edges 221a, 222a, 241a, 242a, 221b, 222b, 241b, 242b, 221c, 222c, 241c, 242c, defining the above-mentioned guide slots on the cover elements.

Insertion of the above-mentioned cursors on the longitudinal guides is made possible by the fact that the guide slots have end longitudinal edges 223a, 224a, 243a, 244a, 223b, 224b, 243b, 244b, 223c, 224c, 243c, 244c, 223d, 224d, 243d, 244d, which are circular in shape and wider than the central zone of the slot, allowing the passage of the circumferential perimeter of the cursor and the consequent insertion of the peripheral groove of the cursor between the opposite longitudinal edges of the corresponding slot.

For the bi-directional drawing of the cover elements in a direction parallel with the support rods 14, 16, the cursors 18b, 20b, 18c, 20c, 18d, 20d of each of the mobile elements engage with the cursors of the adjacent mobile cover elements. Moreover, in accordance with the embodiment illustrated, the cursors 18a, 20a of the fixed cover element 12a constitute means for contact with the cursors 18b, 20b of the cover element 12b, defining means for stopping the travel parallel with the support rods 14, 16.

For the bi-directional drawing of the mobile cover elements in a direction set at a right angle to the support rods, the transversal perpendicular portions 7b, 8b, 7c, 8c, 7d, 8d of the cover elements 12b, 12c, 12d engage with the transversal perpendicular portions of the adjacent cover elements.

Means are also envisaged for dampening the contact between the perpendicular portions of the cover elements.

Said dampening means dampen the contact obtained through movements parallel with the support rods and the contact obtained through movements at right angles to the support rods.

Figure 7:
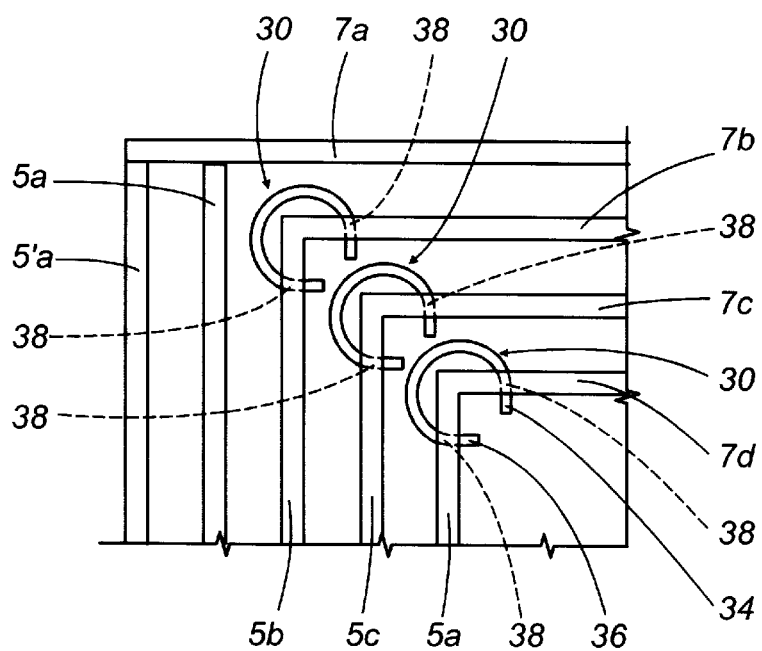
FIGS. 7 and 8 illustrate details of the rear part of the first embodiment of the cover, showing the attachment and operation of the damper element in FIG. 6.

As illustrated in particular in FIG. 7, the dampening means are labeled 30 and are located between the inner and outer edges defined where the transversal perpendicular portions 7a, 7b, 7c, 7d meet the longitudinal portions 5a, 5b, 5c, 5d of the cover elements.

Figure 6:
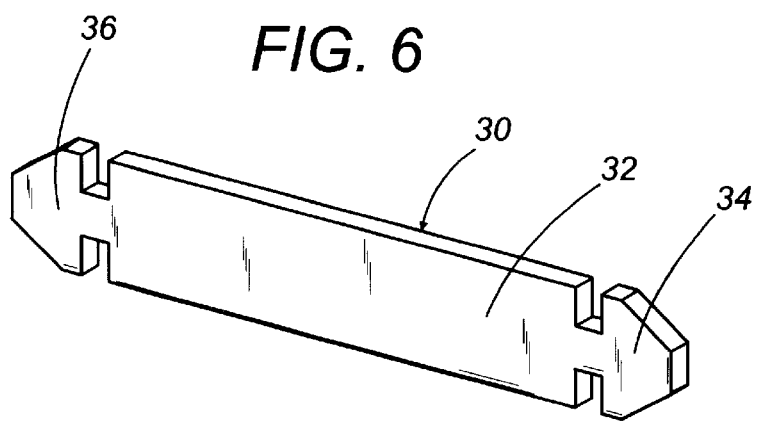
FIG. 6 is a damper element used in the first preferred embodiment.

As is more clearly illustrated with reference to FIG. 6, each damper element 30, made of an elastomeric material, comprises an extended dampening contact body 32, the ends of which are equipped with suitable means for attachment to the cover elements, the attachment means being in the form of snap-in portions which may be narrowed or squashed 34, 36 in such a way that they can be inserted in holes 38 made in the perpendicular walls of the cover element close to a corresponding edge, and elastically expandable so that the damper element 30 engages in and is held by the corresponding cover element.

Figure 8:
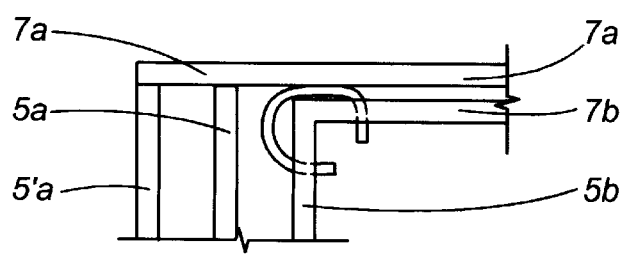

The present damper element is advantageous in that each elastomeric element 30 allows dampening of the impact in two directions set at right angles to one another, with a significant reduction in the number of components required. To prevent the elastomeric element from being damaged by contact with the sharp edge at which it is located, the extended elastomeric element 30 is advantageously positioned in such a way that it is arched and at a given distance from the edge, so that, in the event of contact, the extended elastomeric element can extend freely (as illustrated in FIG. 8) and is not subjected to any acute folding at the point of contact with the edge which, otherwise, might in the long term cut or break the damper element.

Figure 9:
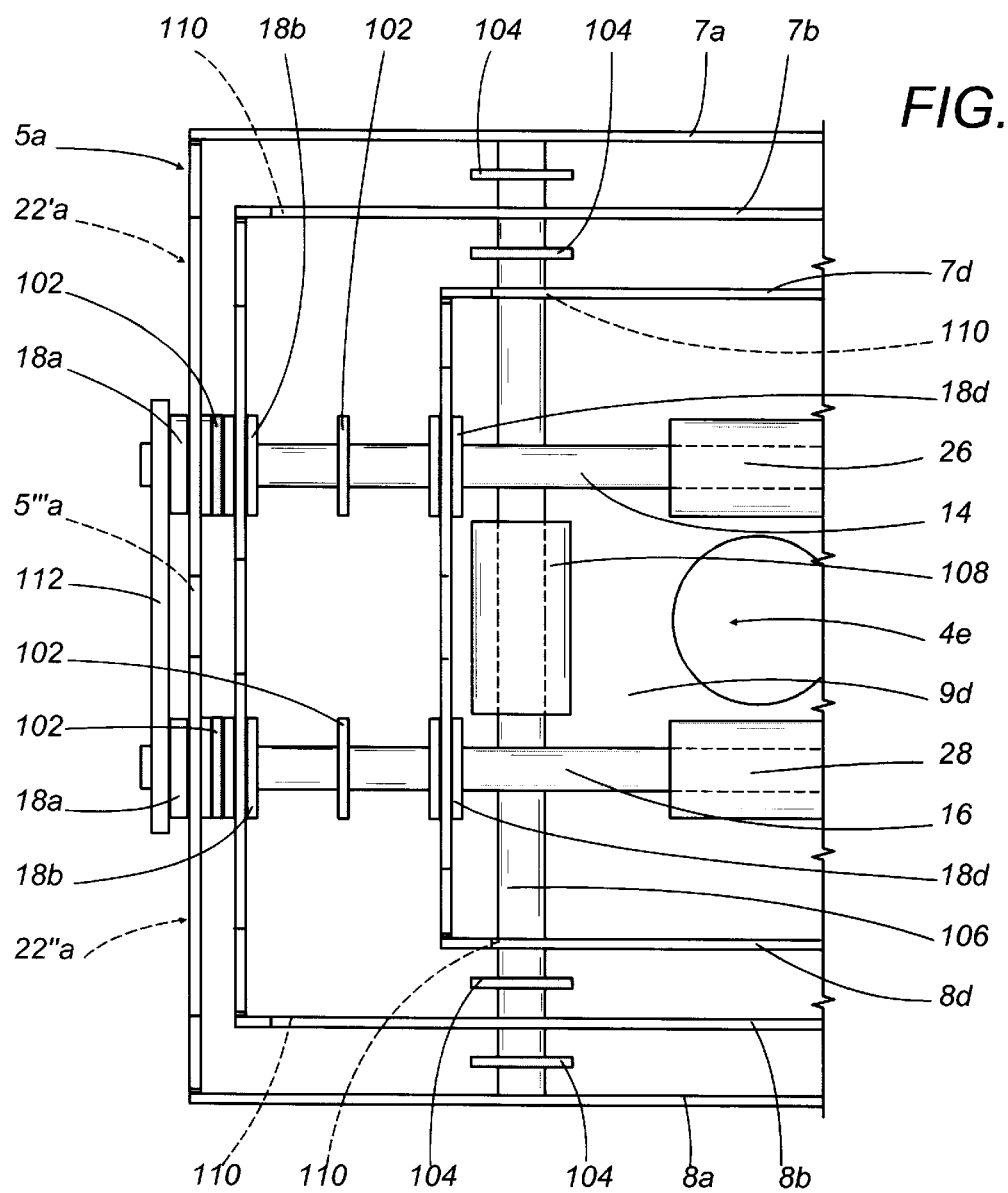
FIGS. 9 and 10 are respectively, a rear view and a side view of details relative to a second preferred embodiment of the cover.
Figure 10:
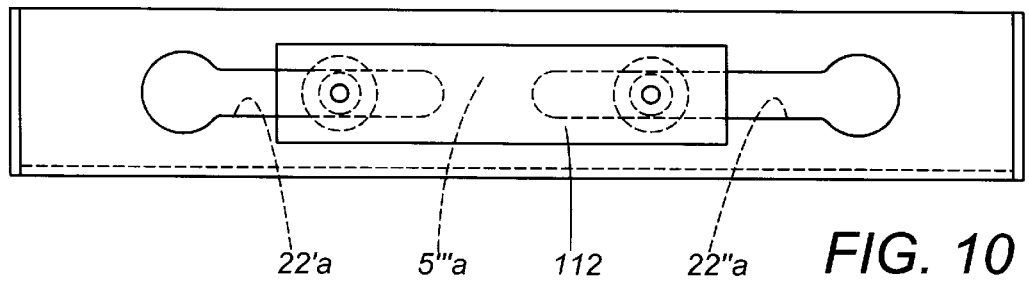

FIGS. 9 and 10 illustrate a second preferred embodiment of the present cover. The present second cover, although having only one intermediate element 12b instead of two 12b and 12c in the previous embodiment, is substantially similar to the first preferred embodiment. To shorten the present text, the parts of the second embodiment similar to those of the first embodiment are not described again in detail.

The present second embodiment differs from the first in the fact that the dampening means are rubber rings 102 coaxially mounted on the support rods 14, 16 between the wheel-shaped cursors, to dampen the engagement impact obtained through movement in the direction parallel with the support rods 14, 16 between the cursors of adjacent cover elements.

Similar elastomeric damper rings 104 are envisaged on at least one rod 106, and preferably on two rods which are positioned symmetrically relative to the central hole 4e, the rod 106 which supports the damper elements being at a right angle to the support rods 14, 16 and fixed to the cover element 12d by a bracket 108 similar to the fixing brackets 26, 28 for the support rods, at a level that is closer to the cover panel 9d than the level of the support bars 14, 16, in such a way that it is positioned between the rods 14, 16 and the cover panel 9d.

The rod 106 passes through elongated slots, labeled 110 as a whole, in the transversal walls 7b, 8b, 7d, 8d, similar to the guide slots for the support rods 14, 16, and allows the damper rings to be positioned between the transversal orthogonal walls 7a, 7b, 7d and 8a, 8b, 8d to dampen their reciprocal impact in the event of contact due to drawing in the direction at a right angle to the support bars 14, 16.

Alternatively, steel helical springs could be used instead of elastomeric pads, the springs mounted coaxially on the rods in place of the rings 102, 104.

The second embodiment is also fitted with means which, during the sliding of the support rods 14, 16, prevent the rods from rotating slightly in the translation plane and moving onto a slight diagonal, consequently jamming in the guide rails at a right angle to the support rods 14, 16.

The means which prevent such jamming or tilting take the form of connecting means between the support rods 14, 16, which are designed to keep the support rods 14, 16 equidistant. Said connecting means between the support rods 14, 16 comprise a first and a second spacer element (only one of which, labeled 112, is illustrated in the figures) in the form of extended plates (of which only the first plate of the first spacer element is illustrated in FIGS. 9 and 10) located on the outside or, if necessary, on the inside of the longitudinal perpendicular walls (only one of which is illustrated, labeled 5a).

To connect the corresponding ends 14', 16' of the support rods 14, 16, the extended plate 112 has holes into which said ends 14', 16' of the rods 14, 16 are firmly fixed, using screws or corresponding locking means. Although not specifically illustrated in the figures, a false wall enclosing said sliding device 112 could be envisaged in this second preferred embodiment.

FIGS. 9 and 10 also illustrate how, in the second preferred embodiment, the slots which allow sliding of the cursors are not each in the form of a single extended slot, as in the first embodiment, but are advantageously split into two longitudinal sections. As illustrated, the sliding slot in FIGS. 9 and 10 comprises a first and a second section 22'a and 22''a, between which, in the central zone which is not affected by the longitudinal movement of the opposite cursors 18b, there is a partition 5'''a which defines a flexural stiffening rib for the perpendicular wall 5a and acts as a spacer between the upper and lower portions, defining said slot, of the perpendicular wall. However, other stiffening means may also be used.

The subsequent Figures from 11 to 15 in the accompanying drawings illustrate a third embodiment of the cover. The cover 310 in the third embodiment is also designed to protect a zone of a machine with moving parts, following the movements of a machining part 311 which can move along an operating path, preferably extending in a vertical plane, and in which the machine moving parts to be protected are located behind the mobile part 311.

The protective cover 310 comprises a plurality of cover elements which, in the third preferred embodiment, consist of an outer cover element 312a which can be attached, in a way better described below, to the machine at a window that allows the machining part 311 to extend outwards, the window being made in the machine fixed frame, a mobile element 312d for connection to the machining part 311, which defines a central opening 304d for the passage of and connection to the machining part 311, and a first, second and third mobile intermediate cover element 312b, 312i, 312c, extending between the cover element which can be connected to the machine 312a and the mobile cover element 312d connected to the machining part 311.

Figure 12:
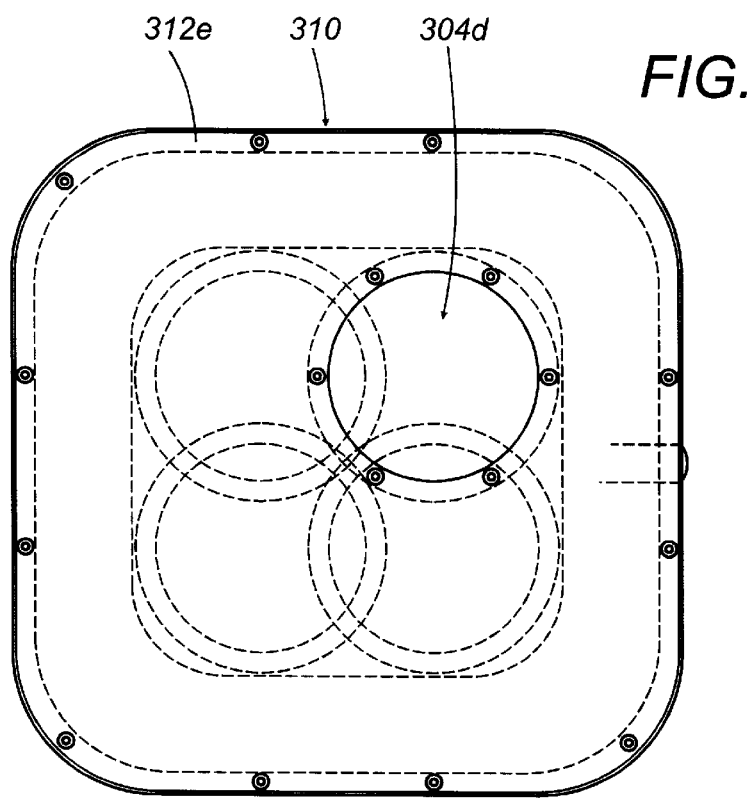
FIG. 12 is a front view of the third preferred embodiment, illustrating various cover operating positions.

The present cover elements 312a, 312b, 312i, 312c, 312d are arranged in order of decreasing size and basically extend one inside the other, around the edges of the machining part 311, so that they are drawn by the machining part 311 during its movements and so keep the zone with moving parts to be protected covered. FIG. 12 clearly illustrates several of the positions that may be adopted by the inner opening 304d of the plurality of cover elements as they follow the attached mobile machining part 311.

The cover elements 312a, 312b, 312i, 312c, 312d have planar cover portions 309a, 309b, 309i, 309c, 309d with substantially central openings 304a, 304b, 304i, 304c, 304d, through which the mobile part passes, relative to each of which the planar cover portions of the inner concentric elements extend in order to keep the window closed.

Figure 13:
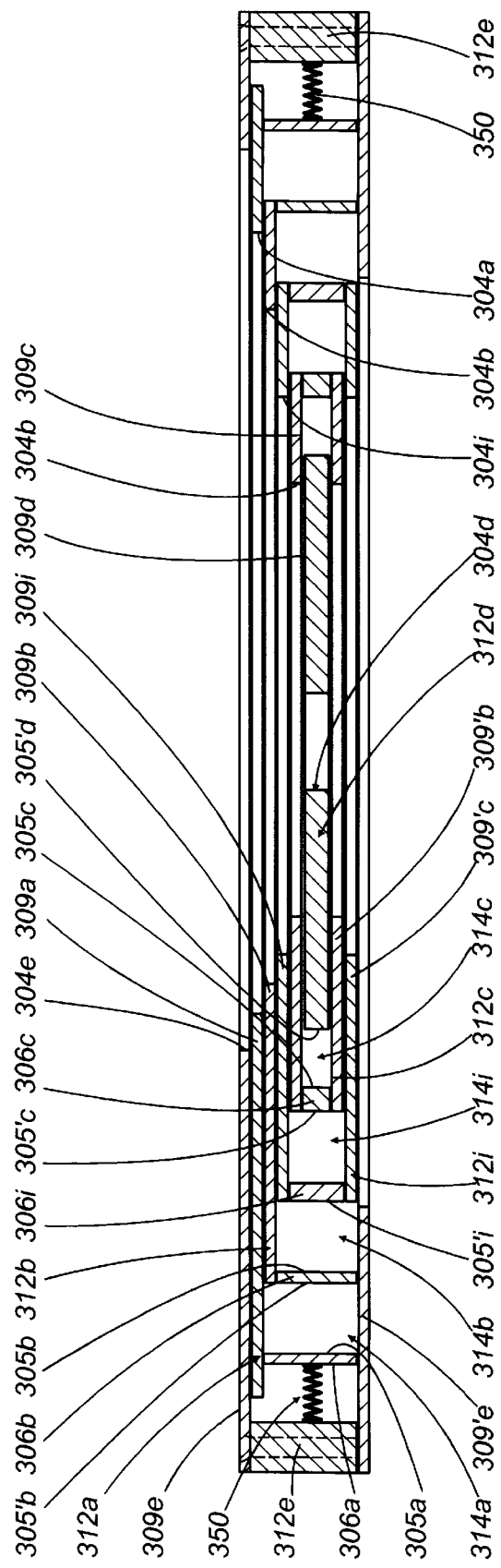
FIG. 13 is a cross-section along a diameter of the third preferred embodiment of the cover.

As is illustrated in particular in FIG. 13, in order to provide a good hermetic seal, the cover portions are made to slide in contact with one another.

The present cover elements 312a, 312b, 312i, 312c, 312d take the form of substantially circular disk elements, although shapes other than the present circular one may be used.

As illustrated particularly in FIG. 13, the intermediate cover elements 312i, 312c have a perpendicular bi-lateral inner perimetric retaining seat for the outer portion of the adjacent, inner cover element 312c, 312d.

The inner seat of the intermediate cover elements 312i, 312c opens radially on the inner edge of the cover elements and is ideal for housing, with sliding contact, the adjacent, inner disk-shaped element 312c, 312d, to support and guide it in its movements, which follow those of the machining part 311.

As illustrated, the support and guide seats 314i, 314c in the cover elements are obtained by giving the cover element a sandwich configuration. For this reason, the intermediate cover elements 312i, 312c have a cover wall 309'i, 309c and an opposite wall 309'i, 309'c, perpendicularly separated from the corresponding cover wall 309i, 309c, to which they are connected, at the outer edge, by intermediate peripheral walls 306i, 306d, which extend perpendicularly.

Even the outermost cover elements 312a, 312b have a perpendicular bi-lateral perimetric retaining seat 314a, 314b for the outer portion of the relative inner, adjacent cover element 312b, 312i.

In these outer cover elements 312a, 312b, perpendicular bi-lateral fixing of the inner elements 312b, 312i is obtained by holding the inner elements 312b, 312i in such a way that they can slide between the cover walls 309a, 309b of the cover elements 312a, 312b and a circular false wall with a central hole 309'e, fixed to the machine frame, on which the lower edges of the perpendicular circumferential walls 306a, 306b of the cover elements 312a, 312b engage, again in such a way that they can slide.

The support and guide seats 314a, 314b, 314i, 314c for the cover elements 312a, 312b, 312i, 312c are fitted with engagement means 305a, 305b, 305i, 305c for corresponding engagement and thrust means 305'b, 305'i, 305'c, 305'd peripheral to the inner adjacent element 312b, 312i , 312c, 312d for drawing the outer concentric cover element 305a, 305b, 305i, 305c in the direction of engagement.

On the perpendicular circumferential wall 306b, 306i, 306c of each mobile disk-shaped element, there is an inner face 305b, 305i, 305c for engagement with and thrusting an outer perimetric face 305'i, 305'c, 305'd *of the inner cover element next to it.*

The perpendicular circumferential face 305a defines means for stopping the outer face 305'b of the cover element 312b, stopping the travel of the plurality of cover elements.

In FIG. 13, the numeral 309e indicates an outer cover frame fixed to the machine frame, with a central opening 304e.

As is more clearly illustrated in FIGS. 14 and 14a there are means 330 for dampening the contact between the peripheral engagement means of the disk-shaped cover elements and the opposite engagement means in the corresponding support and guide seats of the adjacent cover element. As illustrated, the dampening means take the form of a plurality of elastic elements 330 separated by identical angles, that is to say, evenly distributed along the outer circumferential perimeter of alternate cover elements, and in particular only on cover elements 312b and 312c.

The present dampening elements are in the form of "X"-shaped elements, which fit into a corresponding hole in the perpendicular wall of the disk-shaped element, leaving two arms of the "X"-shaped element projecting outwards, to attenuate the contact with the outer concentric element, and the other two arms projecting on the inside, to attenuate the contact with the inner concentric element.

The present cover also comprises an outer frame 312e, which encompasses the above-mentioned plurality of cover elements and is designed to fix the cover to the frame of the machine.

The fixing frame 312e is secured to the machine frame and also acts as a fixing part for the outer cover frame 309e and the closing wall 309'e below.

Elastic connecting means 350 are envisaged between the fixed outer cover element for connection to the frame 312e and the outer element 312a of the plurality of cover elements.

Figure 15:
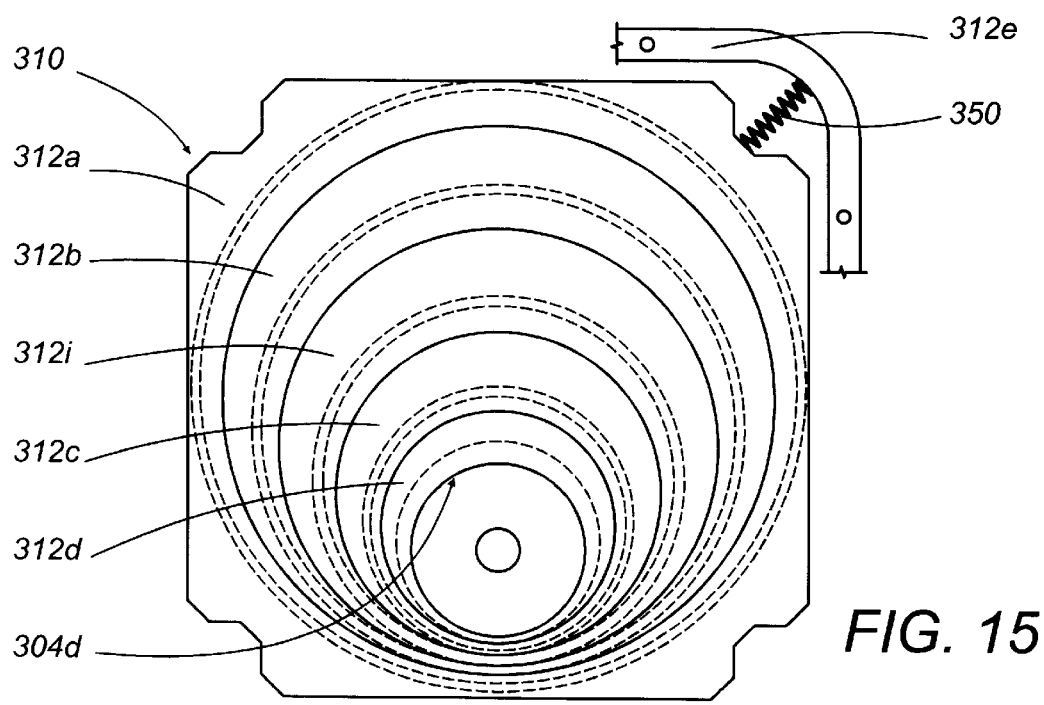
FIG. 15 is a front view of the present third embodiment, with some parts cut away to illustrate, in particular, elastic connecting means on the cover.

As is clearly illustrated in FIG. 15, said elastic connecting means are in the form of tension springs (only one of which is illustrated, in FIG. 15, labeled 350), which are evenly distributed around the circumference of the cover element 312a.

The invention described can be subject to modifications and variations without thereby departing from the scope of the inventive concept. Moreover, all the details of the invention may be substituted by technically equivalent elements.

What is claimed is:

1. A protective cover for a zone of a machine with moving parts, in which the machine comprises a frame and a machining part which can move, relative to the frame, along an operating path, extending in at least one plane; the protective cover consisting of cover means which comprise a plurality of cover elements, including a cover element which can be connected to the machine frame, and a mobile element connected to the machining part; the cover elements being arranged in order of decreasing size and extending around the edge of the machining part and connected to the machining part in such a way that they follow the machining part operating movements, keeping the machining zone covered; there being means to support the mobile cover elements attached to the fixed cover element; wherein the support means comprise a first and a second support rod which are separated from one another, constituting guide means for the movement of the mobile elements in a direction parallel with and a direction at right angle to the above-mentioned rods.

2. The cover according to claim 1, further comprising at least one mobile intermediate cover element located between the fixed cover element and the mobile cover element connected to the machining part.

3. The cover according to claim 2, wherein, to guide the mobile cover elements in a direction parallel with the support rods, there are cursors, moving on the support rods, between each of the cover elements and the support rods.

4. The cover according to claim 3, wherein, to guide the mobile cover elements in a direction at a right angle to the support rods, the cover element connected to the machine frame and the intermediate cover elements have opposite rails, extending at right angles to the support rods so as to guide the support rods.

5. The cover according to claim 4, wherein the guide rails are in the form of slots which extend at a right angle to the support rods.

6. The cover according to claim 5, wherein each of the sliding cursors takes the form of a circular wheel, being inserted coaxially in such a way that it can rotate freely on the relative support rod, said circular wheel having an outer surface with a circumferential groove which houses and engages, in such a way that it can slide, with the longitudinal edges defining the guide slots on the cover elements.

7. The cover according to claim 6, wherein each cover elements has a planar cover panel from whose lateral edges opposite longitudinal portions extend perpendicularly, the guide slots being in the latter.

8. The cover according to claim 4, wherein there are mobile cursor parts between the guide rails and the support rods.

9. The cover according to claim 8, wherein the cursors of the intermediate cover elements can move along the support rods and along the corresponding guide rails, the latter being at right angles to the support rods.

10. The cover according to claim 9, wherein means are provided for fixing the first and second support rods to the mobile element for connection to the machining part, the fixing means being such that they allow the mobile connecting element to slide in a direction parallel with the support rods.

11. The cover according to claim 10, wherein the means for fixing the first and second support rods to the mobile connecting element comprise a first and a second bracket, the brackets being fixed and separated by a given distance at a right angle to the support rods, the fixing brackets extending parallel with the support rods, defining an extended longitudinal hole which houses a support rod in such a way that it can slide.

12. The cover according to claim 3, wherein for bi-directional drawing in a direction which is at a right angle to the support rods, the cover elements comprise transversal perpendicular portions which engage with the transversal perpendicular portions of the adjacent cover elements.

13. The cover according to claim 12, wherein means are provided for dampening the contact for drawing the cover elements.

14. The cover according to claim 12, wherein the means for dampening the contact are designed to dampen the contact obtained through movements parallel with the support rods and the contact obtained through movements at right angles to the support rods.

15. The cover according to claim 14, wherein the means for dampening the contact are located between the perpendicular portions of the adjacent cover elements.

16. The cover according to claim 15, wherein the means for dampening the contact are damper elements positioned between the inner and outer edges defined by the transversal and longitudinal perpendicular portions of the cover elements.

17. The cover according to claim 16, wherein each of the damper elements has an extended contact body, being connected to the cover element at the outside of the relative edge and positioned in an arc around the edge.

18. The cover according to claim 14, wherein the means for dampening the contact obtained through movements at right angles to the support rods are elastic damper elements located between the transversal walls of the cover elements to dampen the impact in the event of contact for drawing.

19. The cover according to claim 18, wherein the elastomeric dampening rings are mounted coaxially on at least one rod, the rod being at a right angle to the support rods and integral with the cover element.

20. The cover according to claim 18, wherein the means for dampening the contact obtained through movements parallel with the support rods are in the form of elastic elements, being mounted coaxially on the support rods between the wheel-shaped cursors on the support rods.

21. The cover according to claim 3, further comprising means for preventing small rotations of the support rods while sliding.

22. The cover according to claim 21, wherein the means which prevent the support rods from rotating as they slide are in the form of connecting means, being integral between the support rods and designed to keep the support rods equidistant.

23. The cover according to claim 3, wherein for drawing in a direction parallel with the support rods, the cursors mobile cover elements engage with the cursors of the adjacent mobile cover elements.

24. The cover according to claim 1, wherein the cover elements are in the form of disk-shaped elements, defining a perimetric seat suitable for receiving the adjacent inner concentric disk-shaped element in such a way that it can slide, supporting and guiding its movements as it follows the movements of the machining part.

25. The cover according to claim 24, wherein the disk-shaped cover elements are in the form of substantially circular elements.

26. The cover according to claim 24, further comprising at least one mobile intermediate cover element located between the fixed cover element and the mobile cover element connected to the machining part.

27. The cover according to claim 26, wherein there are elastic connecting means between the outer cover element for connection to the frame of the machine and the frame itself.

28. The cover according to claim 27, wherein the elastic connecting means comprise plurality of tension springs, being evenly distributed around the circumference of the outer cover element for connection to the machine frame.

29. The cover according to claim 26, wherein the cover element support and guide seats contain engagement means for the corresponding perimetric engagement means located on the perimeter of the inner adjacent element, for drawing the outer concentric cover element in the direction of engagement.

30. The cover according to claim 25, wherein each disk-shaped cover element has an outer perimetric face defining the cover element engagement and thrust means.

31. The cover according to claim 30, wherein there are means for dampening the contact between the disk-shaped cover element peripheral engagement means and the corresponding engagement means of the support and guide seat of the corresponding adjacent cover element.

32. The cover according to claim 31, wherein the damper means are in the form of a plurality of elastic elements, being evenly distributed on the outer circumferential perimeter of the cover element.

33. The cover according to claim 29, wherein each cover element support and guide sea comprises a bottom perimetric wall, defining the engagement means in the seat.

* * * * *